United States Patent
Okubo et al.

(10) Patent No.: US 10,100,763 B2
(45) Date of Patent: Oct. 16, 2018

(54) CONTROL APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventors: Takuya Okubo, Fuji (JP); Norihisa Nakagawa, Susono (JP); Koichi Kimura, Numazu (JP); Takanobu Hosoya, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 126 days.

(21) Appl. No.: 15/377,124

(22) Filed: Dec. 13, 2016

(65) Prior Publication Data

US 2017/0167418 A1  Jun. 15, 2017

(30) Foreign Application Priority Data

Dec. 15, 2015  (JP) .................. 2015-244484

(51) Int. Cl.
*F01N 3/00* (2006.01)
*F02D 41/02* (2006.01)
(Continued)

(52) U.S. Cl.
CPC ........... *F02D 41/024* (2013.01); *F01N 3/101* (2013.01); *F01N 11/007* (2013.01); *F02D 41/0255* (2013.01); *F02D 41/1454* (2013.01); F01N 2430/06 (2013.01); F01N 2560/025 (2013.01); F01N 2900/0416 (2013.01);
(Continued)

(58) Field of Classification Search
CPC ............... F01N 11/007; F01N 2430/06; F01N 2560/025; F01N 2900/1624; F01N 3/101; F02D 41/024; F02D 41/0255; F02D 41/1441; F02D 41/1454; Y02T 10/22; Y02T 10/47

See application file for complete search history.

(56) References Cited

U.S. PATENT DOCUMENTS 6,035,839 A * 3/2000 Ohtani .................. F02D 41/068
123/685
6,760,658 B2 * 7/2004 Yasui .................... F01N 3/0842
123/90.11

(Continued)

FOREIGN PATENT DOCUMENTS

JP  2001-234779 A  8/2001

*Primary Examiner* — Mark Laurenzi
*Assistant Examiner* — Anthony Ayala Delgado
(74) *Attorney, Agent, or Firm* — Hunton Andrews Kurth LLP (57) ABSTRACT

In a control apparatus for use an internal combustion engine in which warming-up time air fuel ratio control is executed, the air fuel ratio of the exhaust gas flowing into the three-way catalyst is changed to an air fuel ratio higher by the predetermined amount, by using as a trigger the timing at which a measured value of an air fuel ratio sensor indicates a rich air fuel ratio. In addition, when the timing at which the measured value of the air fuel ratio sensor indicates the rich air fuel ratio is earlier than a reference timing, the starting-time-rich-air-fuel-ratio in the next and following warming-up time air fuel ratio control is corrected to an air fuel ratio which is higher than that in the current warming-up time air fuel ratio control.

8 Claims, 6 Drawing Sheets

(51) Int. Cl.
- *F01N 3/10* (2006.01)
- *F01N 11/00* (2006.01)
- *F02D 41/14* (2006.01)

(52) U.S. Cl.
CPC .. *F01N 2900/1624* (2013.01); *F02D 41/1441* (2013.01); *F02D 41/1446* (2013.01); *Y02T 10/22* (2013.01); *Y02T 10/26* (2013.01); *Y02T 10/47* (2013.01)

(56) References Cited

U.S. PATENT DOCUMENTS

| | | | | |
|---|---|---|---|---|
| 8,448,421 B2 * | 5/2013 | Bailey | ............... | F01N 11/00 60/275 |
| 8,452,517 B2 * | 5/2013 | Sawada | ............... | F02D 41/0085 123/692 |
| 8,718,902 B2 * | 5/2014 | Katou | ............... | F02D 41/0065 123/568.21 |
| 8,763,365 B2 * | 7/2014 | Ishibashi | ............... | F01N 3/0842 60/276 |
| 8,887,491 B2 * | 11/2014 | Kimura | ............... | F02D 41/0032 60/274 |
| 9,816,415 B2 * | 11/2017 | Hokuto | ............... | F01N 3/0885 |

\* cited by examiner

CONTROL APPARATUS FOR AN INTERNAL COMBUSTION ENGINE

BACKGROUND

Technical Field

The present disclosure relates to a technology for controlling an air fuel ratio of exhaust gas flowing into a three-way catalyst arranged in an exhaust passage of an internal combustion engine.

Description of Background Art

In a first literature, there is disclosed a control apparatus in which when the temperature of cooling water is equal to or less than a reference temperature, in the case of an internal combustion engine being cold started, the air fuel ratio of a mixture is controlled to a rich air fuel ratio lower than a stoichiometric air fuel ratio in an open loop manner. In addition, in this literature, there is also disclosed a method in which in the open loop control, the air fuel ratio of the mixture is gradually changed from the rich air fuel ratio to the stoichiometric air fuel ratio, according to at least one of the rise and the time course of the temperature of the cooling water.

PATENT LITERATURE

Patent Literature 1: Japanese patent laid-open publication No. 2001-234779

SUMMARY

Although the above-mentioned conventional technology is aimed at improving combustion stability in the warming-up process of the internal combustion engine, but it can be the that in the warming-up process of a three-way catalyst arranged in an exhaust passage of the internal combustion engine, too, a method of gradually changing the air fuel ratio of the mixture from the rich air fuel ratio to the stoichiometric air fuel ratio is effective. That is, in the warming-up process of the three-way catalyst, as the purification ability of the three-way catalyst is activated, the oxygen storage ability of the three-way catalyst is also activated. When the oxygen storage ability of the three-way catalyst is activated, the oxygen having been stored in the three-way catalyst after the last time the operation of the internal combustion engine was stopped will become able to be released from the three-way catalyst, so the atmosphere of the three-way catalyst may become a lean air fuel ratio atmosphere. Here, when the three-way catalyst is exposed to an atmosphere in the vicinity of the stoichiometric air fuel ratio, it becomes possible to purify (remove) hydrocarbons, carbon monoxide and nitrogen oxides in the exhaust gas in an efficient manner. Accordingly, in the warming-up process of the three-way catalyst, by adjusting the air fuel ratio of the exhaust gas flowing into the three-way catalyst to a rich air fuel ratio, it is desirable to make the atmosphere of the three-way catalyst to be the atmosphere in the vicinity of the stoichiometric air fuel ratio so that the oxygen, which can be released from the three-way catalyst, is consumed.

However, in the warming-up process of the three-way catalyst, when the degree of richness of the exhaust gas flowing into the three-way catalyst becomes excessively large, the amounts of the hydrocarbons and carbon monoxide, which are not purified (removed or oxidized) by the three-way catalyst may become large. On the other hand, in the warming-up process of the three-way catalyst, when the degree of richness of the exhaust gas flowing into the three-way catalyst becomes excessively small, the amount of the nitrogen oxides, which are not removed (reduced) by the three-way catalyst, may become large.

The present disclosure has been made in view of the actual circumstances as referred to above, and the object of the present disclosure is to improve exhaust emission in a warming-up process of a three-way catalyst, by maintaining an atmosphere of the three-way catalyst at an atmosphere as close to the vicinity of the stoichiometric air fuel ratio as possible, in the warming-up process of the three-way catalyst.

The present disclosure adopts the following means in order to solve the above-mentioned problems. That is, the present disclosure resides in a control apparatus applied to an internal combustion engine, which is provided with a three-way catalyst that is arranged in an exhaust passage of the internal combustion engine and that is configured to have an oxygen storage ability, and an air fuel ratio sensor that is arranged in the exhaust passage at the downstream side of the three-way catalyst and that is configured to measure a physical quantity correlated with an air fuel ratio of exhaust gas flowing out from the three-way catalyst. The control apparatus is configured to execute a warming-up time air fuel ratio control for controlling the air fuel ratio of the exhaust gas flowing into the three-way catalyst from a predetermined starting-time-rich-air-fuel-ratio lower than the stoichiometric air fuel ratio to a final target value in the vicinity of the stoichiometric air fuel ratio in a stepwise manner, in a warming-up process of the three-way catalyst. Then, at the time of the execution of the warming-up time air fuel ratio control, if the timing at which a measured value of the air fuel ratio sensor indicates a rich air fuel ratio is a predetermined reference timing or later, the control apparatus changes the air fuel ratio of the exhaust gas flowing into the three-way catalyst to an air fuel ratio higher than an air fuel ratio at that point in time, by using as a trigger the timing at which the measured value of the air fuel ratio sensor indicates the rich air fuel ratio. In addition, at the time of the execution of the warming-up time air fuel ratio control, if the timing at which the measured value of the air fuel ratio sensor indicates the rich air fuel ratio is earlier than the reference timing, the control apparatus executes a lean correction processing for correcting the starting-time-rich-air-fuel-ratio in the next and following warming-up time air fuel ratio control to an air fuel ratio higher than that in the current warming-up time air fuel ratio control, in addition to the processing of changing the air fuel ratio of the exhaust gas flowing into the three-way catalyst to an air fuel ratio higher than an air fuel ratio at that point in time, by using as a trigger the timing at which the measured value of the air fuel ratio sensor indicates the rich air fuel ratio.

Here, note that "the warming-up process of the three-way catalyst" is a period of time from the time it is estimated that the three-way catalyst began to be activated, until the time it is estimated that the three-way catalyst has been activated to such an extent as to exhibit a desired purification ability (the completion of warming-up). In addition, the "reference timing" referred to herein is a value that has been experimentally obtained in advance so as to adapt to the warming-up control of the three-way catalyst which is equivalent to a new one.

Here, in the warming-up process of the three-way catalyst, the temperature thereof gradually rises from an upstream side portion of the three-way catalyst toward a downstream side portion thereof. In accordance with this, the oxygen storage ability of the three-way catalyst will be activated gradually from the upstream side portion thereof toward the downstream side portion thereof. In that case, the amount of oxygen which can be released per unit time from the three-way catalyst tends to become gradually smaller from the beginning to the end of the warming-up process of the three-way catalyst. Based on such a tendency, it is considered that when the degree of richness of the inflow air fuel ratio is made smaller in a stepwise manner by controlling the air fuel ratio of the exhaust gas flowing into the three-way catalyst (hereinafter, referred to as an inflow air fuel ratio) from the starting-time-rich-air-fuel-ratio to the final target value in a stepwise manner, in the warming-up process of the three-way catalyst, the atmosphere of the three-way catalyst can be maintained at the atmosphere in the vicinity of the stoichiometric air fuel ratio.

However, when the timing at which the inflow air fuel ratio is changed from the starting-time-rich-air-fuel-ratio to the final target value in a stepwise manner is set to the reference timing as mentioned above, there can occur a situation where the inflow air fuel ratio is changed to a higher air fuel ratio in a state where the amount of oxygen released per unit time from an active portion of the three-way catalyst is relatively large. In that case, the atmosphere of the three-way catalyst becomes a lean air fuel ratio, so there is a possibility that the amount of the nitrogen oxides, which are not removed (reduced) by the three-way catalyst may become large.

Accordingly, during the execution of the warming-up time air fuel ratio control, when the timing at which the measured value of the air fuel ratio sensor indicates the rich air fuel ratio is the reference timing or later, the control apparatus for an internal combustion engine according to the present disclosure changes the inflow air fuel ratio to an air fuel ratio higher than an inflow air fuel ratio at that point in time (i.e., an inflow air fuel ratio at the point in time at which the measured value of the air fuel ratio sensor indicates the rich air fuel ratio), by using as a trigger the timing at which the measured value of the air fuel ratio sensor indicates the rich air fuel ratio. Here, the atmosphere of the three-way catalyst is correlated with the air fuel ratio of the exhaust gas flowing out from the three-way catalyst. For that reason, when the measured value of the air fuel ratio sensor indicates the rich air fuel ratio, it can be assumed that the atmosphere of the three-way catalyst is a rich air fuel ratio. Then, it can be assumed that when the atmosphere of the three-way catalyst is a rich air fuel ratio, the amount of oxygen released per unit time from the active portion of the three-way catalyst is relatively small. Accordingly, when the inflow air fuel ratio is changed to the air fuel ratio which is higher than the inflow air fuel ratio at that point in time by using as a trigger the timing at which the measured value of the air fuel ratio sensor indicates the rich air fuel ratio, the atmosphere of the three-way catalyst can be made to be an atmosphere in the vicinity of the stoichiometric air fuel ratio. As a result, in the warming-up process of the three-way catalyst, the amount of the nitrogen oxides, which are not reduced by the three-way catalyst, can be suppressed from becoming large.

In addition, when the period of use of the three-way catalyst become long, the oxygen storage ability of the three-way catalyst may deteriorate due to aging. The oxygen storage capacity of the three-way catalyst becomes smaller in the case where the oxygen storage ability of the three-way catalyst has deteriorated, in comparison with the case where it has not deteriorated. For that reason, the amount of oxygen released per unit time from the active portion of the three-way catalyst in the warming-up process thereof may become small in an earlier period of time in the case where the three-way catalyst has deteriorated, in comparison with the case where it has not deteriorated. In that case, the timing at which the measured value of the air fuel ratio sensor indicates the rich air fuel ratio is earlier than the reference timing. On the other hand, a method can be considered in which in the case where the timing at which the measured value of the air fuel ratio sensor indicates the rich air fuel ratio is earlier than the reference timing, too, similarly to the case where the timing at which the measured value of the air fuel ratio sensor indicates the rich air fuel ratio is on or after the reference timing, the inflow air fuel ratio is changed to an air fuel ratio higher than an inflow air fuel ratio at that point in time, by using as a trigger the timing at which the measured value of the air fuel ratio sensor indicates the rich air fuel ratio.

However, according to the above-mentioned method, in the next and following warming-up time air fuel ratio control, too, the warming-up time air fuel ratio control will be executed on the basis of the same starting-time-rich-air-fuel-ratio as in the current warming-up time air fuel ratio control. For that reason, in the next and following warming-up time air fuel ratio control, too, the timing at which the measured value of the air fuel ratio sensor indicates the rich air fuel ratio becomes earlier than the reference timing, as in the current warming-up time air fuel ratio control. Then, the timing at which the measured value of the air fuel ratio sensor indicates the rich air fuel ratio becomes earlier as the deterioration of the three-way catalyst progresses. Due of this, the interval at which the inflow air fuel ratio is changed becomes shorter as the deterioration of the three-way catalyst progresses. Accordingly, when the warming-up time air fuel ratio control is executed after the deterioration of the three-way catalyst has progressed to some extent, the inflow air fuel ratio may reach the final target value, before the warming of the three-way catalyst is completed. In that case, it becomes difficult to control the inflow air fuel ratio to an air fuel ratio suitable for the degree of activity of the three-way catalyst. As a result, in the warming-up process of the three-way catalyst, hydrocarbons, carbon monoxide, or nitrogen oxides, which are not removed (oxidized or reduced) by the three-way catalyst, may increase in amount.

Accordingly, the control apparatus for an internal combustion engine according to the present disclosure executes the lean correction processing for correcting the starting-time-rich-air-fuel-ratio in the next and following warming-up time air fuel ratio control to an air fuel ratio higher than that in the current warming-up time air fuel ratio control, when the timing at which the measured value of the air fuel ratio sensor indicates the rich air fuel ratio is earlier than the reference timing. In this manner, when the starting-time-rich-air-fuel-ratio in the next and following warming-up time air fuel ratio control is corrected to the air fuel ratio which is higher than that in the current warming-up time air fuel ratio control, the timing at which the measured value of the air fuel ratio sensor indicates the rich air fuel ratio is suppressed from becoming too early with respect to the reference timing, in the next and following warming-up time air fuel ratio control, and accordingly, the interval to change the inflow air fuel ratio is also suppressed from becoming short to an excessive extent. As a result, even in cases where the warming-up time air fuel ratio control is executed after the deterioration of the three-way catalyst has progressed to some extent, the inflow air fuel ratio is suppressed from reaching the final target value, before the warming of the three-way catalyst is completed. Thus, in the warming-up process of the three-way catalyst, hydrocarbons, carbon monoxide, or nitrogen oxides, which are not purified (oxidized or reduced) by the three-way catalyst, can be suppressed from increasing in amount.

Here, note that in the lean correction processing, the starting-time-rich-air-fuel-ratio in the next and following warming-up time air fuel ratio control may be corrected by using as a trigger the timing at which the measured value of the air fuel ratio sensor indicates the rich air fuel ratio, but it is also assumed that the measured value of the air fuel ratio sensor temporarily indicates the rich air fuel ratio due to factors other than the deterioration state of the three-way catalyst. Accordingly, in the case where the timing at which the measured value of the air fuel ratio sensor indicates the rich air fuel ratio is earlier than the reference timing, the control apparatus may correct the starting-time-rich-air-fuel-ratio in the next and following warming-up time air fuel ratio control by executing the lean correction processing, using as a trigger the timing at which the measured value of the air fuel ratio sensor continuously indicates the rich air fuel ratio for a predetermined period of time or more. In that case, in the case where the measured value of the air fuel ratio sensor temporarily indicates the rich air fuel ratio due to factors other than the deterioration state of the three-way catalyst, it is possible to suppress the starting-time-rich-air-fuel-ratio in the next and following warming-up time air fuel ratio control from being corrected unnecessarily. In addition, in the warming-up time air fuel ratio control, when the measured value of the air fuel ratio sensor indicates the lean air fuel ratio, the control apparatus may immediately correct the inflow air fuel ratio to a lower air fuel ratio. According to such a configuration, even in the case where the starting-time-rich-air-fuel-ratio is corrected to an excessively high air fuel ratio by means of the lean correction processing mentioned above, the inflow air fuel ratio at the time of the execution of the warming-up time air fuel ratio control is made to decrease immediately, so that the amount of the nitrogen oxides, which are not removed or reduced by the three-way catalyst in the warming-up process, is suppressed from becoming large to an excessive extent. Moreover, in the warming-up time air fuel ratio control, when the measured value of the air fuel ratio sensor indicates the lean air fuel ratio, the control apparatus may correct the starting-time-rich-air-fuel-ratio in the next and following warming-up time air fuel ratio control to a lower air fuel ratio. According to such a configuration, in cases where the starting-time-rich-air-fuel-ratio is corrected to an excessively high air fuel ratio by means of the lean correction processing mentioned above, the atmosphere of the three-way catalyst at the time of the execution of the next and following warming-up time air fuel ratio control is suppressed from becoming an excessively high air fuel ratio.

According to the present disclosure, in the warming-up process of the three-way catalyst, the atmosphere of the three-way catalyst can be maintained at an atmosphere as close to the vicinity of the stoichiometric air fuel ratio as possible. As a result, it becomes possible to improve exhaust emission in the warming-up process of the three-way catalyst.

Further features of the present disclosure will become apparent from the following description of exemplary embodiments with reference to the attached drawings.

DETAILED DESCRIPTION

Hereinafter, a specific embodiment of the present disclosure will be described based on the attached drawings. However, the dimensions, materials, shapes, relative arrangements and so on of component parts described in the embodiment are not intended to limit the technical scope of the present disclosure to these alone in particular as long as there are no specific statements.

Figure 1:
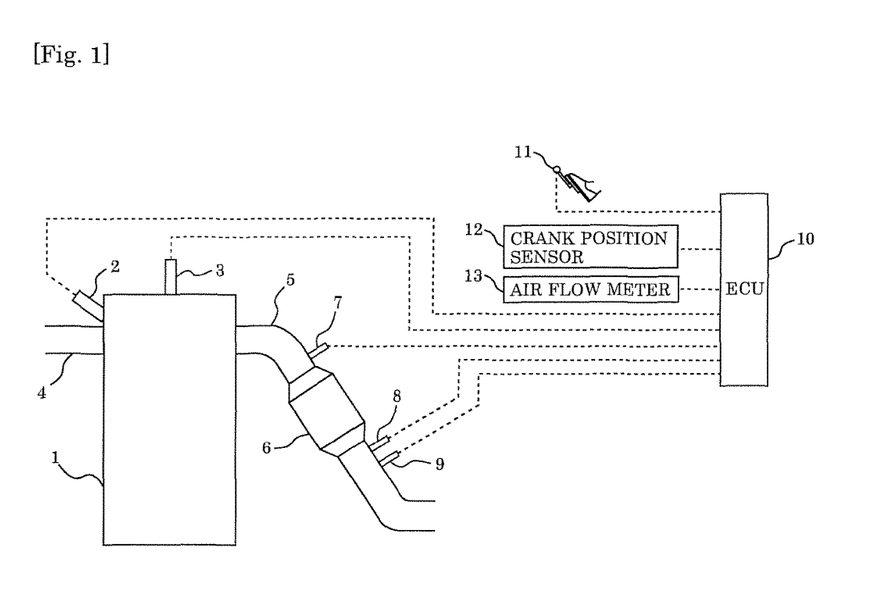
FIG. 1 is a view showing the schematic construction of an internal combustion engine to which the present disclosure is applied.

FIG. 1 is a view showing the schematic construction of an internal combustion engine to which the present disclosure is applied. The internal combustion engine denoted by 1 in FIG. 1 is a spark ignition type internal combustion engine (gasoline engine). The internal combustion engine 1 is provided with fuel injection valves 2 (only one is illustrated) for supplying fuel into unillustrated cylinders, respectively, and spark plugs 3 (only one is illustrated) for igniting fuel supplied into the cylinders from the fuel injection valves 2, respectively. Here, note that the fuel injection valves 2 may directly inject fuel into the individual cylinders, respectively, or may inject fuel into individual intake ports of the cylinders, respectively.

An intake pipe 4 and an exhaust pipe 5 are connected to the internal combustion engine 1. The intake pipe 4 is a pipe in which an intake passage is formed for introducing fresh air (hereinafter simply air) taken in from the atmosphere to an intake port of each cylinder of the internal combustion engine 1. The exhaust pipe 5 is a pipe in which an exhaust passage is formed for passing the exhaust gas discharged from the cylinders of the internal combustion engine 1.

A catalyst casing 6 is arranged in the middle of the exhaust pipe 5. The catalyst casing 6 receives a three-way catalyst. For example, the three-way catalyst is constructed such that a noble metal (e.g., platinum, etc.) having a catalytic action, and an oxygen storage material (e.g., ceria etc.) are supported on a catalyst carrier formed of ceramics. If the three-way catalyst constructed in this manner, when activated, is exposed to an atmosphere in the vicinity of a stoichiometric air fuel ratio, it becomes possible to purify (remove) hydrocarbons, carbon monoxide, and nitrogen oxides contained in the exhaust gas. In addition, if the three-way catalyst, when activated, is exposed to the atmosphere of a lean air fuel ratio which is higher than the stoichiometric air fuel ratio, it becomes possible to store oxygen in the exhaust gas. On the other hand, if the three-way catalyst, when activated, is exposed to the atmosphere of a rich air fuel ratio which is lower than the stoichiometric air fuel ratio, it becomes possible to release the oxygen stored in the three-way catalyst.

On the exhaust pipe 5 at a location upstream of the catalyst casing 6, there is arranged a first air fuel ratio sensor 7 that outputs an electrical signal correlated with the air fuel ratio of the exhaust gas flowing into the three-way catalyst in the catalyst casing 6. In addition, on the exhaust pipe 5 at a location downstream of the catalyst casing 6, there is arranged a second air fuel ratio sensor 8 that outputs an electrical signal correlated with the air fuel ratio of the exhaust gas flowing out from the three-way catalyst in the catalyst casing 6. This second air fuel ratio sensor 8 corresponds to an "air fuel ratio sensor" according to the present disclosure. Moreover, on the exhaust pipe 5 at a location downstream of the catalyst casing 6, there is arranged an exhaust gas temperature sensor 9 that outputs an electrical signal correlated with the temperature of the exhaust gas flowing out from the three-way catalyst in the catalyst casing 6.

An ECU 10 acting as a "control apparatus" according to the present disclosure is provided in combination with the internal combustion engine 1 as constructed in this manner. The ECU 10 is an electronic control unit which is composed of a CPU, a ROM, a RAM, a backup RAM, and so on. The ECU 10 is electrically connected to a variety of kinds of sensors such as the first air fuel ratio sensor 7, the second air fuel ratio sensor 8 and the exhaust gas temperature sensor 9 mentioned above, as well as an accelerator position sensor 11, a crank position sensor 12, an air flow meter 13, and so on. The accelerator position sensor 11 outputs an electric signal correlated with an amount of operation of an accelerator pedal (i.e., a degree of accelerator opening). The crank position sensor 12 outputs an electric signal correlated with a rotational position of an engine output shaft (i.e., a crankshaft) of the internal combustion engine 1. The air flow meter 13 is mounted on the intake pipe 4, and outputs an electric signal correlated with an amount of air (i.e., a mass of air) sucked into the internal combustion engine 1 through the intake pipe 4.

In addition, the ECU 10 is electrically connected to a variety of kinds of equipment such as the fuel injection valves 2, the ignition plugs 3, etc., as mentioned above. The ECU 10 controls the variety of kinds of equipment based on the electric signals inputted from the variety of kinds of sensors mentioned above. For example, when the three-way catalyst of the catalyst casing 6 is in a warming-up completion state (i.e., a state where the three-way catalyst has been activated to such an extent as to exhibit a desired purification ability), the ECU 10 executes post warming-up air fuel ratio control as will be described hereinafter. In the post warming-up air fuel ratio control, the ECU 10 executes the feedback control of the amount of fuel injected from each fuel injection valve 2 so that the measured value of the first air fuel ratio sensor 7 (i.e., the air fuel ratio Faf of the exhaust gas flowing into the three-way catalyst in the catalyst casing 6 (an inflow air fuel ratio)) is made to become a target inflow air fuel ratio Xaf. In that case, the ECU 10 sets the target inflow air fuel ratio Xaf based on the measured value Raf of the second air fuel ratio sensor 8 (i.e., the air fuel ratio of the exhaust gas flowing out from the three-way catalyst of the catalyst casing 6 (hereinafter, referred to as an "outflow air fuel ratio")). Specifically, when the measured value Raf of the second air fuel ratio sensor 8 (the outflow air fuel ratio) becomes a rich air fuel ratio lower than the stoichiometric air fuel ratio, the ECU 10 sets the target inflow air fuel ratio Xaf to a lean air fuel ratio (hereinafter, referred to as an "FB (feedback) lean air fuel ratio") Ylaf which is higher than the stoichiometric air fuel ratio. When the target inflow air fuel ratio Xaf is set to the FB lean air fuel ratio Ylaf, the oxygen contained in the exhaust gas is stored in the three-way catalyst, so that the atmosphere of the three-way catalyst becomes an atmosphere in the vicinity of the stoichiometric air fuel ratio. In that case, the ECU 10 estimates the amount of oxygen stored in the three-way catalyst by using as parameters the measured value Faf of the first air fuel ratio sensor 7 (the inflow air fuel ratio), the measured value of the air flow meter 13 (the amount of intake air), the amount of fuel injected from the fuel injection valve 2 (the amount of fuel injection), etc. Then, when the estimated value of the amount of stored oxygen becomes more than a predetermined reference storage amount, the ECU 10 changes the target inflow air fuel ratio Xaf from the FB lean air fuel ratio Ylaf to a weak rich air fuel ratio (hereinafter, referred to as a "FB weak rich air fuel ratio") Yraf which is slightly lower than the stoichiometric air fuel ratio. When the target inflow air fuel ratio Xaf is set to the FB weak rich air fuel ratio Yraf, the oxygen stored in the three-way catalyst is released from the three-way catalyst, so that the atmosphere of the three-way catalyst becomes an atmosphere in the vicinity of the stoichiometric air fuel ratio. Thereafter, when the measured value Raf of the second air fuel ratio sensor 8 (the outflow air fuel ratio) indicates a rich air fuel ratio again due to a decrease in the amount of oxygen stored in the three-way catalyst, the ECU 10 changes again the target inflow air fuel ratio Xaf from the FB weak rich air fuel ratio Yraf to the FB lean air fuel ratio Ylaf. In other words, the target inflow air fuel ratio Xaf in the post warming-up air fuel ratio control is changed over between the FB lean air fuel ratio Ylaf and the FB weak rich air fuel ratio Yraf in an alternate manner according to the measured value Raf of the second air fuel ratio sensor 8 (the outflow air fuel ratio). In cases where the post warming-up air fuel ratio control is executed by such a method, when the target inflow air fuel ratio Xaf has been set to the FB weak rich air fuel ratio Yraf, oxygen is released from the three-way catalyst in the catalyst casing 6, so that the atmosphere of the three-way catalyst becomes an atmosphere in the vicinity of the stoichiometric air fuel ratio. On the other hand, when the target inflow air fuel ratio Xaf has been set to the FB lean air fuel ratio Ylaf, the three-way catalyst in the catalyst casing 6 stores oxygen in the exhaust gas, whereby the atmosphere of the three-way catalyst becomes the atmosphere in the vicinity of the stoichiometric air fuel ratio. Accordingly, when the three-way catalyst is in the warming-up completion state, it becomes possible to maintain the atmosphere of the three-way catalyst to the atmosphere in the vicinity of the stoichiometric air fuel ratio. As a result, hydrocarbons, carbon monoxide and nitrogen oxides in the exhaust gas can be purified or removed in an efficient manner.

Moreover, in the warming-up process from the time it was estimated that the three-way catalyst began to be activated until the time it was estimated that the three-way catalyst activity was activated to such an extent as to exhibit a desired purification ability (i.e., the completion of warming-up), too, it is desirable to bring the atmosphere of the three-way catalyst to the atmosphere in the vicinity of the stoichiometric air fuel ratio, similar to the time after the warming-up of the three-way catalyst was completed. Accordingly, in this embodiment, in the warming-up process of the three-way catalyst, the warming-up time air fuel ratio control is executed for bringing the target inflow air fuel ratio Xaf closer to the final target value in the vicinity of the stoichiometric air fuel ratio from a starting-time-rich-air-fuel-ratio Yaf lower than the FB weak rich air fuel ratio Yraf, by a predetermined amount Gaf in a stepwise manner. In the following, a method of executing the warming-up time air fuel ratio control in this embodiment will be described.

In the warming-up process of the three-way catalyst, the temperature thereof gradually rises from an upstream side portion of the three-way catalyst toward a downstream side portion thereof, so that the purification ability of the three-way catalyst will be activated gradually from the upstream side portion thereof toward the downstream side portion thereof in accordance with this temperature rise. In addition, as the temperature of the three-way catalyst gradually rises from its upstream side portion toward its downstream side portion thereof, the oxygen storage ability of the three-way catalyst will be activated gradually from its upstream side portion toward its downstream side portion. When the oxygen storage ability of the three-way catalyst is activated, the oxygen having been stored in the three-way catalyst after the last time the operation of the internal combustion engine was stopped will become able to be released from the three-way catalyst. For that reason, in the warming-up process of the three-way catalyst, as the oxygen storage ability of the three-way catalyst is gradually activated from its upstream side portion toward its downstream side portion, oxygen is released sequentially from the location of the three-way catalyst in which the oxygen storage ability is activated. In other words, in the three-way catalyst which is in the warming-up process, the location in which oxygen is released will be shifted from the upstream side portion to the downstream side portion of the three-way catalyst in a sequential manner. However, in the process in which the oxygen storage ability of the three-way catalyst is gradually activated from its upstream side portion toward its downstream side portion, the range of the three-way catalyst activated per unit time tends to become larger as the warming-up process is earlier (i.e., nearer to its beginning), and tends to become smaller as the warming-up process is later (i.e., nearer to its end). For that reason, in the warming-up process of the three-way catalyst, the amount of oxygen released per unit time from the three-way catalyst becomes gradually smaller from the beginning toward the end of the warming-up process.

Figure 2:
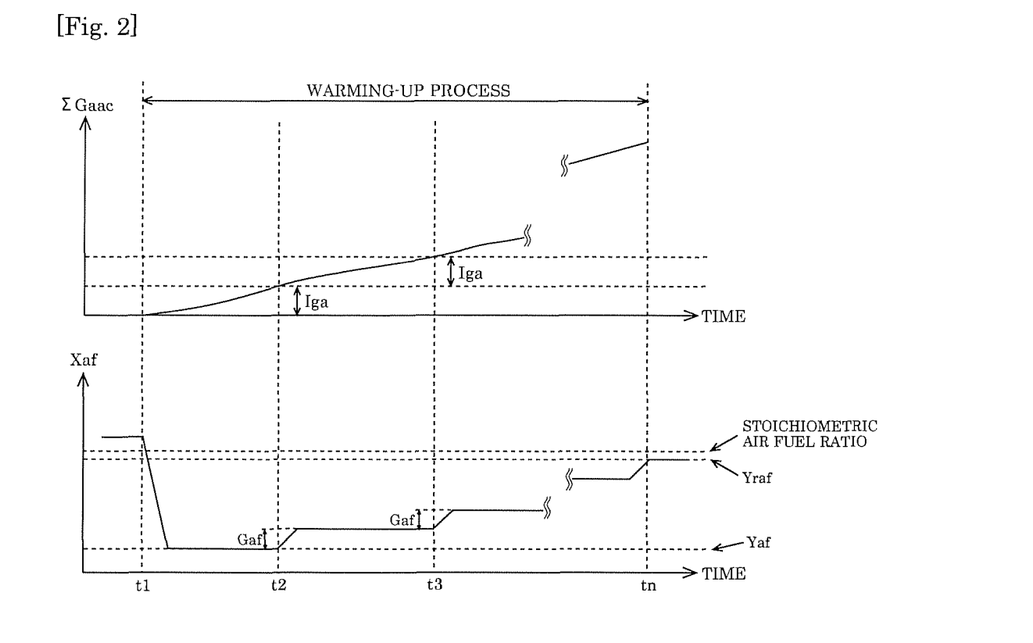
FIG. 2 is a timing chart showing an example of an execution procedure of warming-up time air fuel ratio control.

Accordingly, a method can be considered in which in the warming-up process of the three-way catalyst, the target inflow air fuel ratio Xaf is brought to the final target value (i.e., the FB weak rich air fuel ratio Yraf in an example shown in FIG. 2) from the starting-time-rich-air-fuel-ratio Yaf by the predetermined amount Gaf in a stepwise manner, as shown in FIG. 2. Specifically, when it is estimated that the three-way catalyst began to be activated (at t1 in FIG. 2), the target inflow air fuel ratio Xaf is controlled to the starting-time-rich-air-fuel-ratio Yaf. Subsequently, when an integrated value of the amount of intake air from the time at which the three-way catalyst began to be activated (hereinafter, referred to as a "post activity air amount") ΣGaac reaches a predetermined amount of air Iga (at t2 in FIG. 2), the target inflow air fuel ratio Xaf is changed from the starting-time-rich-air-fuel-ratio Yaf to an air fuel ratio (Yaf+Gaf) which is higher by the predetermined amount Gaf than the starting-time-rich-air-fuel-ratio Yaf. Moreover, when the amount of increase ΔΣGaac of the post activity air amount ΣGaac from the point in time of changing the target inflow air fuel ratio Xaf (t2 in FIG. 2) reaches the predetermined amount of air Iga (at t3 in FIG. 2), the target inflow air fuel ratio Xaf is changed to an air fuel ratio ((Yaf+Gaf)+Gaf) which is still higher by the predetermined amount Gaf. After that, each time the amount of increase ΔΣGaac of the post activity air amount ΣGaac reaches the predetermined amount of air Iga, the processing of changing the target inflow air fuel ratio Xaf to an air fuel ratio, which is higher by the predetermined amount Gaf, is repeated. Then, when the target inflow air fuel ratio Xaf reaches the FB weak rich air fuel ratio Yraf or more (at to in FIG. 2), the warming-up time air fuel ratio control need only be terminated, and the post warming-up air fuel ratio control as stated above need only be started. Here, note that in cases where it is estimated based on another parameter (e.g., the integrated value of the amount of intake air from the time of start-up of the internal combustion engine 1, an integrated value of the amount of fuel injected from the time of start-up of the internal combustion engine 1, an operation period of time of the internal combustion engine 1 from the time of start-up thereof, or the like) that the warming-up of the three-way catalyst was completed, before the target inflow air fuel ratio Xaf reaches the FB weak rich air fuel ratio Yraf or more, the warming-up time air fuel ratio control may be terminated at that point in time, and the post warming-up air fuel ratio control as mentioned above may be started.

Here, in above-mentioned the warming-up time air fuel ratio control, the starting-time-rich-air-fuel-ratio Yaf, the predetermined amount Gaf and the predetermined amount of air Iga are values which have been determined, based on the change over time of the amount of oxygen released per unit time from the three-way catalyst as stated above, in such a manner that the atmosphere of the three-way catalyst is maintained at an atmosphere in the vicinity of the stoichiometric air fuel ratio, in the warming-up process of the three-way catalyst which is in a normal state corresponding to a new one, and these values can have been obtained in advance by adaptation processing making use of experiments, etc. In that case, the predetermined amount Gaf may be a fixed amount, or it may be changed in a stepwise manner from the beginning to the end of the warming-up time air fuel ratio control. Here, note that, the timing at which the target inflow air fuel ratio Xaf is changed to an air fuel ratio higher by the predetermined amount Gaf, as indicated by t2, t3 in FIG. 2, corresponds to a "reference timing" according to the present disclosure.

The post activity air amount ΣGaac is a parameter used as an index of the degree of activity of the three-way catalyst in the warming-up process. The degree of activity of the three-way catalyst in the warming-up process is correlated with the degree of temperature rise of the three-way catalyst in the warming-up process. Then, the degree of temperature rise of the three-way catalyst in the warming-up process is correlated with the post activity air amount ΣGaac which is the integrated value of the amount of intake air from the time at which the three-way catalyst began to be activated. Specifically, as the post activity air amount ΣGaac increases, the temperature rise range of the three-way catalyst extends more to its downstream side portion, and accordingly, the activity range of the three-way catalyst extends more to its downstream side portion. Here, note that in the warming-up process of the three-way catalyst, the range of the three-way catalyst activated per unit time tends to become larger as the warming-up process is earlier (i.e., nearer to its beginning), and tends to become smaller as the warming-up process is later (i.e., nearer to its end), as stated above. Accordingly, there is a tendency in which when the post activity air amount ΣGaac is relatively small, the amount of oxygen released per unit time from the three-way catalyst becomes large, but as the post activity air amount ΣGaac becomes larger, the amount of oxygen released per unit time from the three-way catalyst become smaller. Thus, it is considered that the atmosphere of the three-way catalyst can be maintained at the atmosphere in the vicinity of the stoichiometric air fuel ratio, by making the target inflow air fuel ratio Xaf higher in a stepwise manner as the post activity air amount ΣGaac becomes larger, as shown in FIG. 2. Note that the degree of temperature rise of the three-way catalyst in the warming-up process is correlated with the post activity air amount ΣGaac which is the integrated value of the amount of intake air from the time at which the three-way catalyst began to be activated. Accordingly, the reference timing may be decided by using the integrated value of the amount of fuel injected from the activation start time of the three-way catalyst or the operation period of time of the internal combustion engine 1 from the activation start time of the three-way catalyst, instead of using the post activity air amount ΣGaac. In that case, an amount of fuel injection or an operation period of time, which corresponds to the predetermined amount of air Iga, need only be used, instead of the predetermined amount of air Iga.

However, the degree of temperature rise of the three-way catalyst in the warming-up process may vary. For that reason, when the timing to change the target inflow air fuel ratio Xaf to an air fuel ratio higher by the predetermined amount Gaf is set to the reference timing, as described in the above-mentioned explanation of FIG. 2, there is a possibility that the target inflow air fuel ratio Xaf may be changed to the air fuel ratio higher by the predetermined amount Gaf in a state where the amount of oxygen released per unit time from an active portion of the three-way catalyst is relatively large. In that case, the atmosphere of the three-way catalyst may become an atmosphere of a lean air fuel ratio. As a result, the amount of the nitrogen oxides, which are not purified (reduced) by the three-way catalyst, may become large.

Accordingly, in the warming-up time air fuel ratio control of this embodiment, when the timing at which the measured value Raf of the second air fuel ratio sensor 8 (the outflow air fuel ratio) indicates a rich air fuel ratio is the reference timing or later, the target inflow air fuel ratio Xaf is changed to an air fuel ratio higher by the predetermined amount Gaf, by using as a trigger the timing at which the measured value Raf of the second air fuel ratio sensor 8 (the outflow air fuel ratio) indicates the rich air fuel ratio. When the measured value Raf of the second air fuel ratio sensor 8 (the outflow air fuel ratio) indicates a rich air fuel ratio, it can be assumed that the atmosphere of the three-way catalyst is a rich air fuel ratio. Due of this, it can be assumed that when the atmosphere of the three-way catalyst is a rich air fuel ratio, the amount of oxygen released per unit time from the active portion of the three-way catalyst is relatively small. Accordingly, when the target inflow air fuel ratio Xaf is changed to an air fuel ratio higher by the predetermined amount Gaf by using as a trigger the timing at which the measured value Raf of the second air fuel ratio sensor 8 (the outflow air fuel ratio) indicates a rich air fuel ratio, the atmosphere of the three-way catalyst can be made to be an atmosphere in the vicinity of the stoichiometric air fuel ratio. As a result, the amount of the nitrogen oxides, which are not purified (reduced) by the three-way catalyst, can be suppressed from becoming large.

In addition, when the period of use of the three-way catalyst become long, the oxygen storage ability of the three-way catalyst may deteriorate due to aging. The oxygen storage capacity of the three-way catalyst becomes smaller in the case where the oxygen storage ability of the three-way catalyst has deteriorated, in comparison with the case where it has not deteriorated. For that reason, the amount of oxygen able to be released per unit time from the active portion of the three-way catalyst in the warming-up process thereof may become small in an earlier period of time in the case where the three-way catalyst has deteriorated, in comparison with the case where it has not deteriorated. As a result, the measured value Raf of the second air fuel ratio sensor 8 (the outflow air fuel ratio) may indicate a rich air fuel ratio, for example, in the middle of a period of time of t1-t2 or in the middle of a period of time of t2-t3 in the above-mentioned FIG. 2. That is, in the case where the three-way catalyst has deteriorated, the timing at which the measured value Raf of the second air fuel ratio sensor 8 (the outflow air fuel ratio) indicates a rich air fuel ratio may become earlier than the reference timing. When the target inflow air fuel ratio Xaf is changed to an air fuel ratio higher by the predetermined amount Gaf by using the reference timing as a trigger in such a state, the amount of oxygen released per unit time from the active portion of the three-way catalyst may become small before the target inflow air fuel ratio Xaf is changed, and the atmosphere of the three-way catalyst may become an atmosphere of a rich air fuel ratio. In that case, there is a possibility that the amounts of the hydrocarbons and the carbon monoxide, which are not removed or oxidized by the three-way catalyst, may become large.

With respect to the problem as mentioned above, there can be considered a method in which in the case where the timing at which the measured value Raf of the second air fuel ratio sensor 8 (the outflow air fuel ratio) indicates a rich air fuel ratio is earlier than the reference timing, too, the target inflow air fuel ratio Xaf is changed to an air fuel ratio higher by the predetermined amount Gaf, by using as a trigger the timing at which the measured value Raf of the second air fuel ratio sensor 8 (the outflow air fuel ratio) indicates a rich air fuel ratio, similar to the case where the timing at which the measured value Raf of the second air fuel ratio sensor 8 (the outflow air fuel ratio) indicates a rich air fuel ratio is the reference timing or later.

However, according to the above-mentioned method, in the next and following warming-up time air fuel ratio control, too, the target input air fuel ratio Xaf will be controlled on the basis of the same or equivalent starting-time-rich-air-fuel-ratio Yaf as in the current warming-up time air fuel ratio control. For that reason, in the next and following warming-up time air fuel ratio control, too, the timing at which the measured value Raf of the second air fuel ratio sensor 8 (the outflow air fuel ratio) indicates a rich air fuel ratio becomes earlier than the reference timing, as in the current warming-up time air fuel ratio control. Then, the timing at which the measured value Raf of the second air fuel ratio sensor 8 (the outflow air fuel ratio) indicates a rich air fuel ratio becomes earlier as the deterioration of the three-way catalyst progresses. Due to this, the interval at which the target inflow air fuel ratio Xaf is changed to an air fuel ratio higher by the predetermined amount Gaf becomes shorter as the deterioration of the three-way catalyst progresses. Accordingly, when the warming-up time air fuel ratio control is executed after the deterioration of the three-way catalyst has progressed to some extent, the target inflow air fuel ratio Xaf may reach the final target value, before the warming-up of the three-way catalyst is completed.

Accordingly, in the warming-up time air fuel ratio control of this embodiment, when the timing at which the measured value Raf of the second air fuel ratio sensor 8 (the outflow air fuel ratio) indicates a rich air fuel ratio is the reference timing or later, the target inflow air fuel ratio Xaf is changed to an air fuel ratio higher by the predetermined amount Gaf, by using as a trigger the timing at which the measured value Raf of the second air fuel ratio sensor 8 (the outflow air fuel ratio) indicates a rich air fuel ratio. In addition, in the warming-up time air fuel ratio control of this embodiment, when the timing at which the measured value Raf of the second air fuel ratio sensor 8 (the outflow air fuel ratio) indicates a rich air fuel ratio is earlier than the reference timing, the lean correction processing for correcting the starting-time-rich-air-fuel-ratio Yaf in the next and following warming-up time air fuel ratio control to an air fuel ratio higher than that in the current warming-up time air fuel ratio control is executed.

Figure 3:
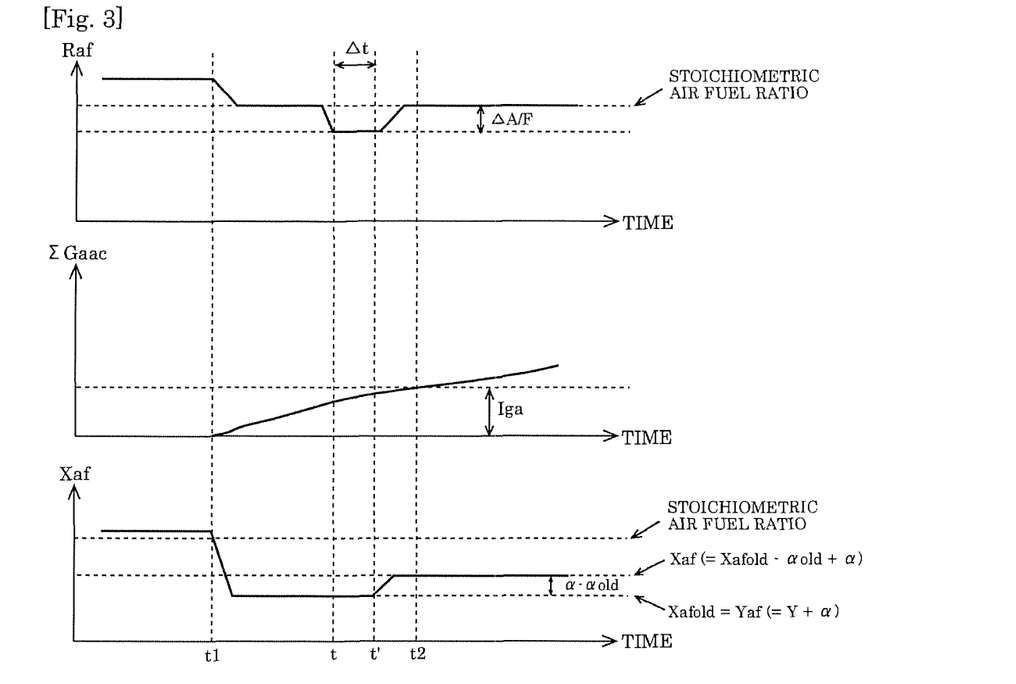
FIG. 3 is a timing chart showing a procedure for obtaining an air fuel ratio correction value.

Here, a procedure for executing the lean correction processing in this embodiment will be described based on FIG. 3. FIG. 3 is a timing chart which shows a procedure to learn a correction value (hereinafter, referred to as an "air fuel ratio correction value") a for correcting the starting-time-rich-air-fuel-ratio in the next and following warming-up time air fuel ratio control, in the case where the timing at which the measured value Raf of the second air fuel ratio sensor 8 (the outflow air fuel ratio) indicates a rich air fuel ratio is earlier than the reference timing. A point in time t1 in FIG. 3 is the timing at which it is estimated that the three-way catalyst began to be activated, as in the above-mentioned FIG. 2. A point in time t2 in FIG. 3 indicates the timing (reference timing) at which the amount of increase ΔΣGaac of the post activity air amount ΣGaac from the timing t1 at which it is estimated that the three-way catalyst began to be activated reaches the predetermined amount of air Iga, as in the above-mentioned FIG. 2.

As shown in FIG. 3, in cases where the measured value Raf of the second air fuel ratio sensor 8 (the outflow air fuel ratio) indicates a rich air fuel ratio at a timing (t in FIG. 3) earlier than the reference timing t2, the processing for learning the above-mentioned air fuel ratio correction value α is executed. In that case, the learning processing of the air fuel ratio correction value α may be executed immediately when the measured value Raf of the second air fuel ratio sensor 8 (the outflow air fuel ratio) indicates a rich air fuel ratio. However, it is also assumed that the measured value Raf of the second air fuel ratio sensor 8 (the outflow air fuel ratio) temporarily indicates a rich air fuel ratio due to factors other than the deterioration state of the three-way catalyst. Accordingly, in this embodiment, the learning of the air fuel ratio correction value α is executed, after it has been determined that the measured value Raf of the second air fuel ratio sensor 8 (the outflow air fuel ratio) indicates a rich air fuel ratio continuously for a predetermined period of time Δt or more. Then, when it has been determined that the measured value Raf of the second air fuel ratio sensor 8 (the outflow air fuel ratio) indicates a rich air fuel ratio continuously for a predetermined period of time Δt or more, the air fuel ratio correction value α is updated (learned) according to the following expression (1).

$$\alpha = \alpha old + \Delta A/F^* \beta \quad (1)$$

αold in expression (1) is an air fuel ratio correction value obtained when the last or preceding lean correction processing was executed. Here, note that in the process of use of the three-way catalyst, in cases where first lean correction processing is executed, αold is set to zero (initial value). In addition, ΔA/F in expression (1) is a difference between the measured value (the outflow air fuel ratio) Raf and the stoichiometric air fuel ratio (=(the stoichiometric air fuel ratio)−(the outflow air fuel ratio Raf)) at the time when the measured value Raf of the second air fuel ratio sensor 8 (the outflow air fuel ratio) indicates a rich air fuel ratio. β in expression (1) is a smoothing or moderating coefficient which is larger than 0 and smaller than 1.

When the air fuel ratio correction value α is learned by the procedure mentioned above, the starting-time-rich-air-fuel-ratio Yaf in the next and following warming-up time air fuel ratio control is corrected based on the air fuel ratio correction value α. Specifically, the starting-time-rich-air-fuel-ratio Yaf in the next and following warming-up time air fuel ratio control is corrected according to the following expression (2).

$$Yaf = Y + \alpha \quad (2)$$

Y in expression (2) is a starting-time-rich-air-fuel-ratio which is suitable in cases where the three-way catalyst is in a state corresponding (equivalent) to a new one. Although the air fuel ratio correction value α in expression (2) is a value which is updated according to the above-mentioned expression (1) each time the lean correction processing is executed, it is set to 0 (initial value) until the first lean correction processing is executed.

In the next and following warming-up time air fuel ratio control, the target input air fuel ratio Xaf is controlled on the basis of the starting-time-rich-air-fuel-ratio Yaf corrected according to the above-mentioned expression (2), the timing at which the measured value Raf of the second air fuel ratio sensor 8 (the outflow air fuel ratio) indicates a rich air fuel ratio is suppressed from becoming excessively early with respect to the reference timing, and accordingly, the interval at which the target inflow air fuel ratio Xaf is changed to an air fuel ratio higher by the predetermined amount Gaf is also suppressed from becoming excessively short. As a result, even in cases where the warming-up time air fuel ratio control is executed after the deterioration of the three-way catalyst has progressed to some extent, the target inflow air fuel ratio Xaf is suppressed from reaching the final target value, before the warming-up of the three-way catalyst is completed. Consequently, in the warming-up process of the three-way catalyst, hydrocarbons, carbon monoxide and nitrogen oxides, which are not purified (oxidized or reduced) by the three-way catalyst, can be suppressed from increasing in amount.

Moreover, in this embodiment, the air fuel ratio correction value α obtained by the procedure mentioned above is made to reflect on the target inflow air fuel ratio Xaf in the current warming-up time air fuel ratio control. Specifically, when the air fuel ratio correction value α is learned by the execution of the lean correction processing (at t' in FIG. 3), the target inflow air fuel ratio Xaf is corrected according to the following expression (3).

$$Xaf = Xafold - \alpha old + \alpha \quad (3)$$

Xafold in expression (3) is a target inflow air fuel ratio before correction.

When the target inflow air fuel ratio Xaf in the current warming-up time air fuel ratio control is corrected according to the above-mentioned expression (3), the interval at which the target inflow air fuel ratio Xaf is changed to an air fuel ratio higher by the predetermined amount Gaf is suppressed from becoming excessively short, after that correction. As a result, in the current warming-up time air fuel ratio control, the target inflow air fuel ratio Xaf is also suppressed from reaching the final target value, before the warming-up of the three-way catalyst is completed. Thus, in the warming-up process of the three-way catalyst, the amounts of the hydrocarbons or the carbon monoxide, which are not purified (oxidized) by the three-way catalyst, can be suppressed from becoming large.

Here, note that in the warming-up time air fuel ratio control per one time, the lean correction processing may be executed a plurality of times, but the frequency of the execution of the lean correction processing may be limited to one time only. This is because even if the air fuel ratio correction value α obtained in the above-mentioned lean correction proceeding is reflected on the target inflow air fuel ratio Xaf in the current warming-up time air fuel ratio control, the timing at which the measured value Raf of the second air fuel ratio sensor 8 (the outflow air fuel ratio) indicates a rich air fuel ratio may thereafter become earlier than the reference timing, and in such a case, when the lean correction processing is executed again, the starting-time-rich-air-fuel-ratio Yaf in the next and following warming-up time air fuel ratio control may become an excessively high air fuel ratio. However, even if the frequency of the execution of the lean correction processing in the warming-up time air fuel ratio control per one time is limited, the starting-time-rich-air-fuel-ratio Yaf in the next and following warming-up time air fuel ratio control may become an excessively high air fuel ratio. In that case, when the next and following warming-up time air fuel ratio control is executed, the atmosphere of the three-way catalyst may become an atmosphere of a lean air fuel ratio, and the amount of the nitrogen oxides, which are not removed (reduced) by the three-way catalyst may become large. Accordingly, in the case where the warming-up time air fuel ratio control based on the starting-time-rich-air-fuel-ratio Yaf corrected by the lean correction processing is executed, when the measured value Raf of the second air fuel ratio sensor 8 (the outflow air fuel ratio) indicates a lean air fuel ratio, the current target inflow air fuel ratio Xaf is immediately corrected to an air fuel ratio which is lower by a predetermined amount of correction. The predetermined amount of correction may be a fixed value which has been set in advance, or may be a variable value which is decided according to the difference between the measured value (the outflow air fuel ratio) Raf and the stoichiometric air fuel ratio (=(the outflow air fuel ratio Raf)–(the stoichiometric air fuel ratio)) at the time when the measured value Raf of the second air fuel ratio sensor 8 (the outflow air fuel ratio) indicates a rich air fuel ratio. Moreover, at the time of the execution of the warming-up time air fuel ratio control, when the timing at which the measured value Raf of the second air fuel ratio sensor 8 (the outflow air fuel ratio) indicates a rich air fuel ratio, the air fuel ratio correction value α may be corrected according to the following expression (4).

$$\alpha = \alpha old - \gamma \quad (4)$$

γ in expression (4) is a value which is decided to be larger than zero but not large than αold. This γ may be a fixed value which has been set in advance, or may be a variable value which is decided according to the difference between the measured value (the outflow air fuel ratio) Raf and the stoichiometric air fuel ratio (=(the outflow air fuel ratio Raf)–(the stoichiometric air fuel ratio)) at the time when the measured value Raf of the second air fuel ratio sensor 8 (the outflow air fuel ratio) indicates a rich air fuel ratio. In cases where the air fuel ratio correction value α is corrected in this manner, a value equivalent to γ may be used as the above-mentioned predetermined amount of correction used at the time of correcting the current target inflow air fuel ratio Xaf.

Figure 4:
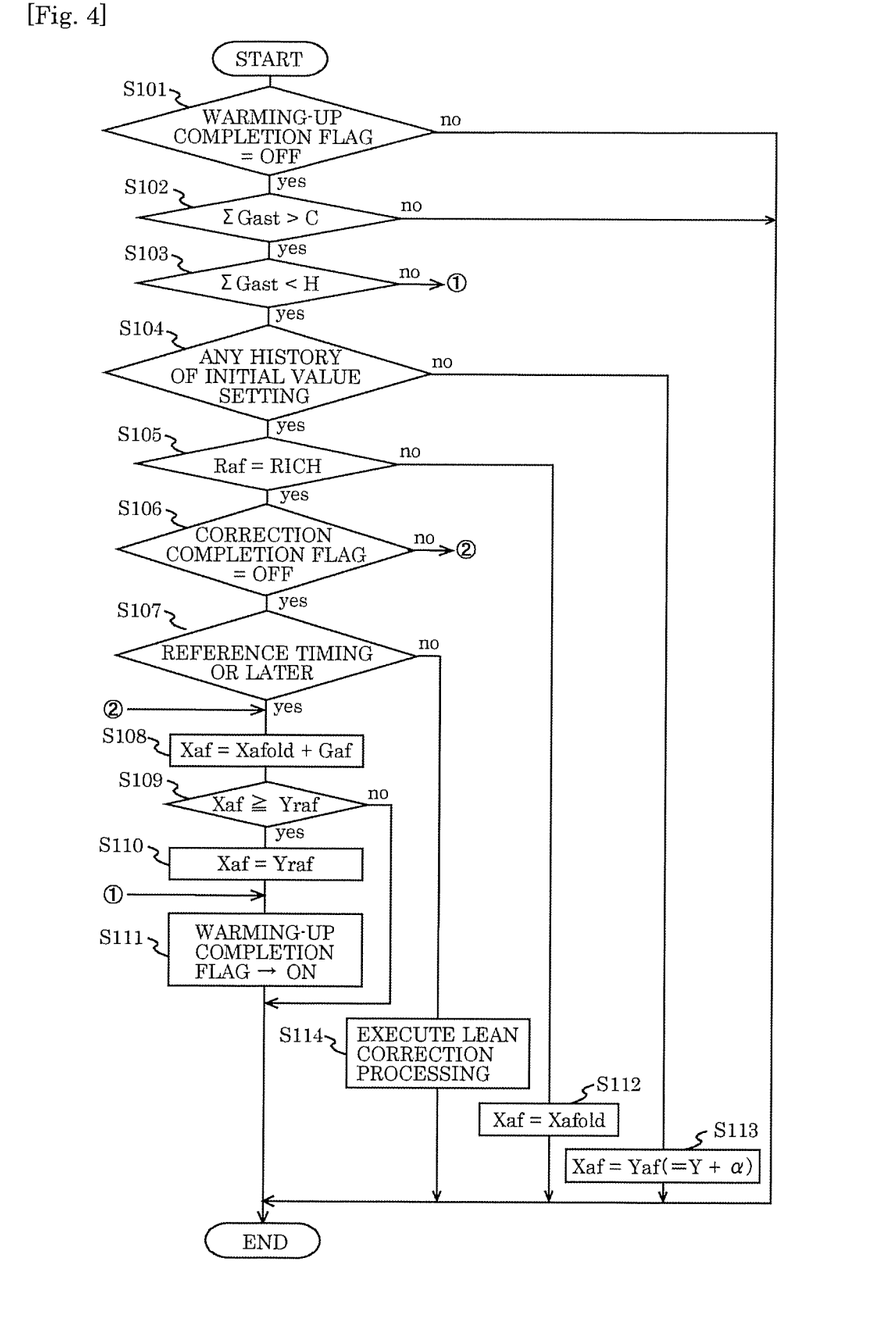
FIG. 4 is a flow chart showing a processing routine executed by an ECU at the time of the execution of the warming-up time air fuel ratio control.

Hereinafter, an execution procedure for the warming-up time air fuel ratio control in this embodiment will be described in line with processing routines in FIG. 4 through FIG. 6. First, FIG. 4 is a flow chart showing a processing routine executed by the ECU 10 at the time of executing the warming-up time air fuel ratio control. This processing routine has been stored in the ROM, etc., of the ECU 10 in advance, and is executed in a repeated manner by means of the ECU 10.

In the processing routine of FIG. 4, first in the processing of step S101, the ECU 10 determines whether a warming-up completion flag is on. The warming-up completion flag is a flag which is set on when it is estimated that the warming-up of the three-way catalyst was completed, and which is reset to off by the stop of the operation or the start-up of the internal combustion engine 1. In cases where a negative determination is made in the processing of step S101, the warming-up of the three-way catalyst has already been completed, and hence, the ECU 10 terminates the execution of this processing routine. On the other hand, in cases where an affirmative determination is made in the processing of step S101, the warming-up of the three-way catalyst has not yet been completed, the routine goes to the processing of step S102.

In the processing of step S102, the ECU 10 determines whether an integrated value ΣGast of the amount of intake air from the time of start-up of the internal combustion engine 1 (hereinafter, referred to as a "post start-up air amount") is more than an activation start determination amount C. The activation start determination amount C referred to herein is an amount with which it can be estimated that at least a part (e.g., a location in the vicinity of an upstream side end face) of the three-way catalyst has been activated, when the post start-up air amount ΣGast exceeds the activation start determination amount C. In cases where a negative determination is made in the processing of step S102 (ΣGast≤C), it can be considered that the three-way catalyst is in an inactive state where it does not begin to be activated, and hence, the ECU 10 terminates the execution of this processing routine. On the other hand, in cases where an affirmative determination is made in the processing of step S102 (ΣGast>C), it can be considered that at least a part of the three-way catalyst has been activated, and hence the routine of the ECU 10 goes to the processing of step S103.

In the processing of step S103, the ECU 10 determines whether the post start-up air amount ΣGast is smaller than an activation completion determination amount H. The activation completion determination amount H referred to herein is an amount with which it can be estimated that the activation of the three-way catalyst has been completed (completion of the warming-up), when the post start-up air amount ΣGast becomes equal to or more than the activation completion determination amount H. In cases where a negative determination is made in the processing of step S103 (ΣGast≥H), it can be considered that the three-way catalyst is in an activation completed state (warming-up completion state), and hence, the routine of the ECU 10 goes to the processing of step S111, where the warming-up completion flag is set to on. On the other hand, in cases where an affirmative determination is made in the processing of step S103 (EGast<H), it can be considered that the three-way catalyst is in a warming-up process where the activation thereof has not been completed, and hence the routine of the ECU 10 goes to the processing of step S104.

In the processing of step S104, the ECU 10 determines whether there is any history in which an initial value (a starting-time-rich-air-fuel-ratio Yaf) has been set as the target inflow air fuel ratio Xaf in the current warming-up time air fuel ratio control. For example, a flag may have been set in advance which is turned on when the starting-time-rich-air-fuel-ratio Yaf was set as the target inflow air fuel ratio Xaf, and which is turned off when it is estimated that the warming-up of the three-way catalyst has been completed, wherein when the flag is on, it may be determined that there is a history in which the starting-time-rich-airfuel-ratio Yaf was set as the target inflow air fuel ratio Xaf. In cases where a negative determination is made in the processing of step S104, the routine of the ECU 10 goes to the processing of step S112, where an initial value (a starting-time-rich-air-fuel-ratio Yaf (=Y+α)) is set as the target inflow air fuel ratio Xaf. On the other hand, in cases where an affirmative determination is made in the processing of step S104, the routine of the ECU 10 goes to the processing of step S105.

In the processing of step S105, the ECU 10 determines whether the measured value Raf of the second air fuel ratio sensor 8 (the outflow air fuel ratio) indicates a rich air fuel ratio. In cases where a negative determination is made in the processing of step S105, the measured value Raf of the second air fuel ratio sensor 8 (the outflow air fuel ratio) will indicate the stoichiometric air fuel ratio or a lean air fuel ratio. However, when the measured value Raf of the second air fuel ratio sensor 8 (the outflow air fuel ratio) indicates a lean air fuel ratio, the air fuel ratio correction value α is corrected in the processing routine of FIG. 6 to be described later, and hence, here it is considered that the measured value Raf of the second air fuel ratio sensor 8 (the outflow air fuel ratio) indicates the stoichiometric air fuel ratio. In other words, in cases where a negative determination is made in the processing of step S105, it is considered that the atmosphere of the three-way catalyst becomes an atmosphere of the stoichiometric air fuel ratio by the action of the oxygen storage ability of the three-way catalyst. Accordingly, the routine of the ECU 10 goes to the processing of step S112, where the target inflow air fuel ratio Xaf is maintained at the last value (the current target inflow air fuel ratio) Xafold of the target inflow air fuel ratio. On the other hand, in cases where an affirmative determination is made in the processing of step S105, the routine of the ECU 10 goes to the processing of step S106.

In the processing of step S106, the ECU 10 determines whether a correction completion flag is off. The correction completion flag is a flag which is turned on when the lean correction processing to be described later is terminated, and which is turned off at the time of the start of the warming-up time air fuel ratio control. In cases where an affirmative determination is made in the processing of step S106, the lean correction processing has not yet been executed in the current warming-up time air fuel ratio control, and hence, the routine of the ECU 10 goes to the processing of step S107.

In the processing of step S107, the ECU 10 determines whether the timing at which the measured value Raf of the second air fuel ratio sensor 8 (the outflow air fuel ratio) indicated a rich air fuel ratio is the reference timing or later. For example, in cases where the target inflow air fuel ratio Xaf at the current point in time has not been changed from the starting-time-rich-air-fuel-ratio Yaf, when the post activity air amount ΣGaac has reached the predetermined amount of air Iga or more at the time the measured value Raf of the second air fuel ratio sensor 8 (the outflow air fuel ratio) indicated a rich air fuel ratio, a determination need only be made that the timing at which the measured value Raf of the second air fuel ratio sensor 8 (the outflow air fuel ratio) indicated a rich air fuel ratio is the reference timing or later (e.g., t2 or later in FIG. 2). In addition, in cases where the target inflow air fuel ratio Xaf at the current point in time has already been changed from the starting-time-rich-air-fuel-ratio Yaf, when the amount of increase ΔΣGaac of the post activity air amount ΣGaac from the point in time at which the target inflow air fuel ratio Xaf was changed the last time reaches the predetermined amount of air Iga or more, at the time the measured value Raf of the second air fuel ratio sensor 8 (the outflow air fuel ratio) indicated a rich air fuel ratio, a determination need only be made that the timing at which the measured value Raf of the second air fuel ratio sensor 8 (the outflow air fuel ratio) indicated a rich air fuel ratio is the reference timing or later (e.g., t3 or later in FIG. 2). In cases where an affirmative determination is made in the processing of step S107, the routine of the ECU 10 goes to the processing of step S108.

In the processing of step S108, the ECU 10 changes the target inflow air fuel ratio Xaf to an air fuel ratio higher by the predetermined amount Gaf. Specifically, the ECU 10 calculates a new target inflow air fuel ratio Xaf by adding the predetermined amount Gaf to the target inflow air fuel ratio Xafold at the current point in time. Subsequently, the routine of the ECU 10 goes to the processing of step S109, where it is determined whether the target inflow air fuel ratio Xaf calculated in the above-mentioned processing of step S108 is equal to or more than the final target value in the vicinity of the stoichiometric air fuel ratio (e.g., the FB weak rich air fuel ratio Yraf in an example shown in FIG. 4). In cases where an affirmative determination is made in the processing of step S109 (Xaf≥Yraf), the routine of the ECU 10 goes to the processing of step S110, where the target inflow air fuel ratio Xaf is set to the FB weak rich air fuel ratio Yraf. Then, the ECU 10 terminates the warming-up time air fuel ratio control, and starts the post warming-up air fuel ratio control mentioned above. Subsequently, the routine of the ECU 10 goes to the processing of step S111, where the warming-up completion flag is turned on. In addition, in cases where a negative determination is made in the above-mentioned processing of step S109, the ECU 10 continues the warming-up time air fuel ratio control according to the target inflow air fuel ratio Xaf calculated in the above-mentioned processing of step S108.

Here, note that in cases where a negative determination is made in the above-mentioned processing of step S106, the lean correction processing has already been executed once, in the current warming-up time air fuel ratio control. In that case, it is necessary not to execute the lean correction processing twice or more, and hence, the ECU 10 goes to the processing of step S108, while skipping the processing of step S107. In other words, after the lean correction processing has already been executed once in the current warming-up time air fuel ratio control, the target inflow air fuel ratio Xaf is changed to an air fuel ratio higher by the predetermined amount Gaf, by using as a trigger the timing at which the measured value Raf of the second air fuel ratio sensor 8 (the outflow air fuel ratio) indicates a rich air fuel ratio.

In addition, in cases where a negative determination is made in the above-mentioned processing of step S107, the routine of the ECU 10 goes to the processing of step S114, where the lean correction processing is executed. Specifically, the ECU 10 executes the lean correction processing according to a subroutine shown in FIG. 5. In the subroutine of FIG. 5, the ECU 10 determines, in the processing of step S201, whether the correction completion flag is on. The correction completion flag is a flag which is turned on when the lean correction processing is terminated, and which is turned off at the time of the start of the warming-up time air fuel ratio control, as mentioned above. In cases where a negative determination is made in the processing of step S201, the lean correction processing has already been executed once in the current warming-up time air fuel ratio control, and hence, the ECU 10 ends the execution of this processing routine. On the other hand, in cases where an affirmative determination is made in the processing of step S201, the lean correction processing has not yet been executed in the current warming-up time air fuel ratio control, and hence, the routine of the ECU 10 goes to the processing of step S202.

In the processing of step S202, the ECU 10 determines whether a period of time (a rich period of time) in which the measured value Raf of the second air fuel ratio sensor 8 (the outflow air fuel ratio) continuously indicates a rich air fuel ratio is equal to or more than the predetermined period of time Δt. In cases where a negative determination is made in the processing of step S202, the measured value Raf of the second air fuel ratio sensor 8 (the outflow air fuel ratio) may indicate a rich air fuel ratio temporarily due to factors other than the deterioration state of the three-way catalyst, and hence, the ECU 10 terminates the execution of this subroutine, without executing the lean correction processing. On the other hand, in cases where an affirmative determination is made in the processing of step S202, it can be considered that the oxygen storage ability of the three-way catalyst has deteriorated, and hence, the routine of the ECU 10 goes to the processing of step S203.

In the processing of step S203, the ECU 10 calculates a difference ΔA/F between the measured value (the outflow air fuel ratio) Raf and the stoichiometric air fuel ratio (=(the stoichiometric air fuel ratio)−(the outflow air fuel ratio Raf)) at the time when the measured value Raf of the second air fuel ratio sensor 8 (the outflow air fuel ratio) indicates a rich air fuel ratio, and determines whether the difference ΔA/F is larger than a predetermined value K. The predetermined value K referred to herein is a dead band which has been set in advance in order to suppress hunting in the warming-up time air fuel ratio control. In cases where a negative determination is made in the processing of step S203, the ECU 10 ends the execution of this subroutine, without executing the lean correction processing. On the other hand, in cases where an affirmative determination is made in the processing of step S203, the routine of the ECU 10 goes to the processing of step S204.

In the processing of step S204, the ECU 10 updates the air fuel ratio correction value a according to the above-mentioned expression (1). When the air fuel ratio correction value α is updated in this manner, the value of the starting-time-rich-air-fuel-ratio Yaf (=Y+α) in the next and following warming-up time air fuel ratio control will be corrected in an automatic manner.

After executing the above-mentioned processing of step S204, the routine of the ECU 10 goes to the processing of step S205, where the air fuel ratio correction value a updated by the above-mentioned processing of step S204 is made to reflect on the target inflow air fuel ratio Xaf at the current point in time. Specifically, the ECU 10 corrects the target inflow air fuel ratio Xaf at the current point in time according to the above-mentioned expression (3). In that case, further, the ECU 10 may change the target inflow air fuel ratio Xaf, on which the air fuel ratio correction value a was reflected, to an air fuel ratio higher by the predetermined amount Gaf.

When the ECU 10 has executed the processing of step S205, the routine thereof goes to the processing of step S206, where the above-mentioned correction completion flag is turned on.

Next, a procedure for correcting the air fuel ratio correction value a in the case where the timing at which the measured value Raf of the second air fuel ratio sensor 8 (the outflow air fuel ratio) indicates a rich air fuel ratio, at the time of the execution of the warming-up time air fuel ratio control, will be explained along FIG. 6. FIG. 6 is a flow chart showing a processing routine repeatedly executed by the ECU 10 during the period of execution of the warming-up time air fuel ratio control.

Figure 6:
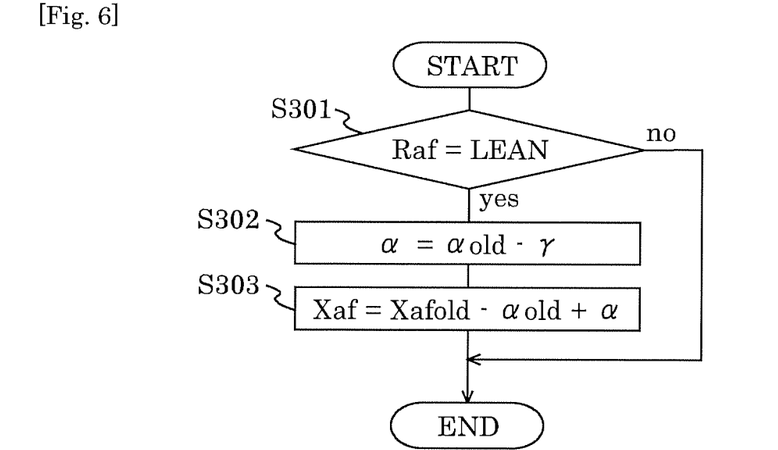
FIG. 6 is a flow chart showing a processing routine executed by the ECU when an outflow air fuel ratio indicates a lean air fuel ratio at the time of the execution of the warming-up time air fuel ratio control.

In the processing routine of FIG. 6, the ECU 10 determines, in the processing of step S301, whether the measured value Raf of the second air fuel ratio sensor 8 (the outflow air fuel ratio) indicates a lean air fuel ratio. In cases where a negative determination is made in the processing of step S301, the ECU 10 ends the execution of this processing routine. On the other hand, in cases where an affirmative determination is made in the processing of step S301, the routine of the ECU 10 goes to the processing of step S302.

In the processing of step S302, the ECU 10 updates the air fuel ratio correction value a according to the above-mentioned expression (4). Subsequently, in the processing of step S303, the ECU 10 makes the air fuel ratio correction value a immediately reflect on the target inflow air fuel ratio Xaf at the current point in time, by substituting for the above-mentioned expression (3) the air fuel ratio correction value a updated by the above-mentioned processing of step S302. In that case, in the current warming-up time air fuel ratio control, the amount of the nitrogen oxides, which are not reduced by the three-way catalyst, can be suppressed from becoming large.

Figure 5:
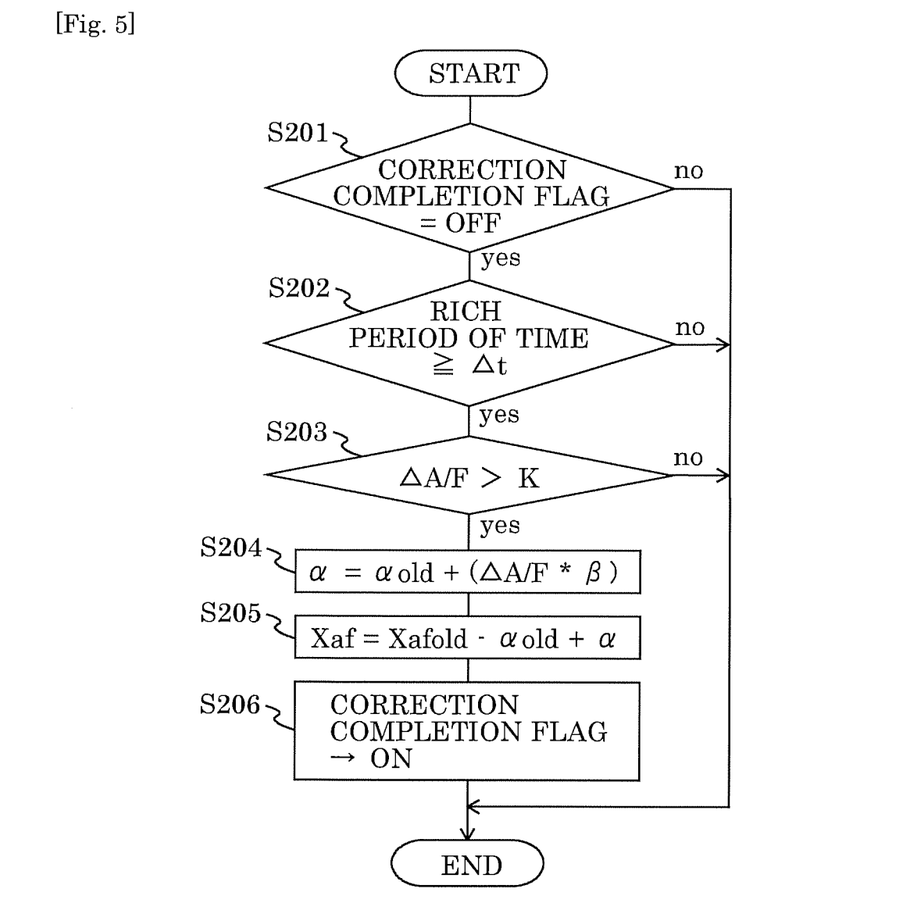
FIG. 5 is a flow chart showing a subroutine executed by the ECU at the time of executing the lean correction processing.

When the warming-up time air fuel ratio control is executed according to the processing routines of FIG. 4 through FIG. 6, in the warming-up process of the three-way catalyst, the target inflow air fuel ratio Xaf will be changed from the starting-time-rich-air-fuel-ratio to the final target value (the FB weak rich air fuel ratio Yraf) in a stepwise manner, by using as a trigger the timing at which the measured value Raf of the second air fuel ratio sensor 8 (the outflow air fuel ratio) indicates a rich air fuel ratio. As a result, the atmosphere of the three-way catalyst in the warming-up process thereof can be maintained at the atmosphere in the vicinity of the stoichiometric air fuel ratio.

Moreover, in cases where the timing at which the measured value Raf of the second air fuel ratio sensor 8 (the outflow air fuel ratio) indicates a rich air fuel ratio becomes earlier than the reference timing resulting from the deterioration over time of the three-way catalyst, etc., the starting-time-rich-air-fuel-ratio Yaf in the next and following warming-up time air fuel ratio control is corrected to a higher air fuel ratio, so that the timing at which the measured value Raf of the second air fuel ratio sensor 8 (the outflow air fuel ratio) indicates a rich air fuel ratio in the next and following warming-up time air fuel ratio control is suppressed from becoming excessively early with respect to the reference timing, and accordingly, the interval at which the target inflow air fuel ratio Xaf is changed to an air fuel ratio higher by the predetermined amount Gaf is also suppressed from becoming excessively short. As a result, even in cases where the warming-up time air fuel ratio control is executed in a state where the deterioration of the three-way catalyst has progressed to some extent, the target inflow air fuel ratio Xaf is suppressed from reaching the final target value (the FB weak rich air fuel ratio Yraf), before the warming-up of the three-way catalyst is completed.

Further, even in cases where the starting-time-rich-air-fuel-ratio Yaf is corrected to an excessively high air fuel ratio by means of the above-mentioned lean correction processing, when the measured value Raf of the second air fuel ratio sensor 8 (the outflow air fuel ratio) indicates a lean air fuel ratio (i.e., at the point in time at which the atmosphere of the three-way catalyst shifts from the stoichiometric air fuel ratio to a lean air fuel ratio), the air fuel ratio correction value a will be immediately corrected, and due to this, the target inflow air fuel ratio Xaf at the time of the execution of the warming-up time air fuel ratio control will be immediately corrected to a lower air fuel ratio, so that the amount of the nitrogen oxides, which are not removed or reduced by the three-way catalyst in the warming-up process, is suppressed from becoming large.

Accordingly, according to the warming-up time air fuel ratio control of this embodiment, it is possible to maintain the atmosphere of the three-way catalyst in the warming-up process thereof at an atmosphere as close to the vicinity of the stoichiometric air fuel ratio as possible, so that the amounts of hydrocarbons, carbon monoxide and nitrogen oxides, which are not purified (oxidized or reduced) by the three-way catalyst in its warming-up process, can be suppressed from becoming large.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-244484, filed on Dec. 15, 2015, which is hereby incorporated by reference herein in its entirety.

What is claimed is:

1. A control apparatus for use an internal combustion engine comprising: a three-way catalyst that is arranged in an exhaust passage of the internal combustion engine, and that is configured to have an oxygen storage ability; and an air fuel ratio sensor that is arranged in the exhaust passage at a location downstream of the three-way catalyst, and that is configured to measure a physical quantity correlated with an air fuel ratio of exhaust gas flowing out from the three-way catalyst, the control apparatus configured to execute a warming-up time air fuel ratio control for controlling the air fuel ratio of the exhaust gas flowing into the three-way catalyst from a predetermined starting-time-rich-air-fuel-ratio lower than the stoichiometric air fuel ratio to a final target value in the vicinity of the stoichiometric air fuel ratio in a stepwise manner, in a warming-up process of the three-way catalyst, wherein at the time of the execution of the warming-up time air fuel ratio control, when the timing at which a measured value of the air fuel ratio sensor indicates a rich air fuel ratio is a predetermined reference timing or later, the control apparatus changes the air fuel ratio of the exhaust gas flowing into the three-way catalyst to an air fuel ratio higher than an air fuel ratio at that point in time, by using as a trigger the timing at which the measured value of the air fuel ratio sensor indicates the rich air fuel ratio, and when the timing at which the measured value of the air fuel ratio sensor indicates the rich air fuel ratio is earlier than the reference timing, the control apparatus executes a lean correction processing for correcting the starting-time-rich-air-fuel-ratio in the next and following warming-up time air fuel ratio control to an air fuel ratio higher than that in the current warming-up time air fuel ratio control, in addition to the processing of changing the air fuel ratio of the exhaust gas flowing into the three-way catalyst to an air fuel ratio higher than an air fuel ratio at that point in time, by using as a trigger the timing at which the measured value of the air fuel ratio sensor indicates the rich air fuel ratio.

2. The control apparatus for an internal combustion engine as set forth in claim 1, wherein
in the case where the timing at which the measured value of the air fuel ratio sensor indicates the rich air fuel ratio is earlier than the reference timing, the control apparatus corrects the starting-time-rich-air-fuel-ratio in the next and following warming-up time air fuel ratio control by executing the lean correction processing, using as a trigger the timing at which the measured value of the air fuel ratio sensor continuously indicated the rich air fuel ratio for a predetermined period of time or more.

3. The control apparatus for an internal combustion engine as set forth in claim 1, wherein
at the time of the execution of the warming-up time air fuel ratio control, when the measured value of the air fuel ratio sensor indicates the lean air fuel ratio, the control apparatus immediately changes the air fuel ratio of the exhaust gas flowing into the three-way catalyst to a lower air fuel ratio, by using as a trigger the timing at which the measured value of the air fuel ratio sensor indicates the lean air fuel ratio.

4. The control apparatus for an internal combustion engine as set forth in claim 2, wherein
at the time of the execution of the warming-up time air fuel ratio control, when the measured value of the air fuel ratio sensor indicates the lean air fuel ratio, the control apparatus immediately changes the air fuel ratio of the exhaust gas flowing into the three-way catalyst to a lower air fuel ratio, by using as a trigger the timing at which the measured value of the air fuel ratio sensor indicates the lean air fuel ratio.

5. The control apparatus for an internal combustion engine as set forth in claim 1, wherein
at the time of the execution of the warming-up time air fuel ratio control, when the measured value of the air fuel ratio sensor indicates the lean air fuel ratio, the control apparatus corrects the starting-time-rich-air-fuel-ratio in the next and following warming-up time air fuel ratio control to a lower air fuel ratio.

6. The control apparatus for an internal combustion engine as set forth in claim 2, wherein
at the time of the execution of the warming-up time air fuel ratio control, when the measured value of the air fuel ratio sensor indicates the lean air fuel ratio, the control apparatus corrects the starting-time-rich-air-fuel-ratio in the next and following warming-up time air fuel ratio control to a lower air fuel ratio.

7. The control apparatus for an internal combustion engine as set forth in claim 3, wherein
at the time of the execution of the warming-up time air fuel ratio control, when the measured value of the air fuel ratio sensor indicates the lean air fuel ratio, the control apparatus corrects the starting-time-rich-air-fuel-ratio in the next and following warming-up time air fuel ratio control to a lower air fuel ratio.

8. The control apparatus for an internal combustion engine as set forth in claim 4, characterized in that
at the time of the execution of the warming-up time air fuel ratio control, when the measured value of the air fuel ratio sensor indicates the lean air fuel ratio, the control apparatus corrects the starting-time-rich-air-fuel-ratio in the next and following warming-up time air fuel ratio control to a lower air fuel ratio.

* * * * *